United States Patent Office  
3,201,478  
Patented Aug. 17, 1965

3,201,478  
METHOD OF PRODUCING A TERTIARY MONOHYDRIC ALCOHOL  
Harry Chafetz, Poughkeepsie, N.Y., assignor to Texaco Inc., New York, N.Y., a corporation of Delaware  
No Drawing. Filed June 2, 1960, Ser. No. 33,401  
9 Claims. (Cl. 260—618)

This invention relates to a new process for producing alcohols. More specifically, the invention pertains to the preparation of monohydric alcohols having a tertiary beta carbon atom of the formula $$R^1-CH-CH_2-\underset{R^4}{\overset{R^3}{\underset{|}{\overset{|}{C}}}}-CH_2OH$$
$$\phantom{R^1-CH-CH_2}R^2$$

where $R^1$ and $R^2$ are selected from the group consisting of hydrogen, alkyl, aryl, alkaryl, and aralkyl radicals and $R^3$ and $R^4$ are selected from the group consisting of alkyl, aryl, alkaryl, and aralkyl radicals.

Tertiary beta carbon monohydric alcohols hereafter known as tertiary beta alcohols are particularly useful as reactants in the preparation of synthetic lubricants. One class of synthetic lubricants are complex esters prepared from monohydric and polyhydric alcohols and dibasic acids such as sebacic acid. It has been found that synthetic lubricants of this class prepared from alcohols having a tertiary beta carbon atom are significantly more resistant to thermal decomposition than synthetic lubricants prepared from alcohols without a tertiary beta carbon atom.

In the past tertiary beta alcohols have been prepared by several methods. Some of these prior art methods defined by schematic chemical equation are found below:

(1) Alkylation and reduction of esters:

$$RRCH\overset{O}{\overset{\|}{C}}OR + RBr \xrightarrow{NaNH_2} RRR\overset{O}{\overset{\|}{C}}COR \xrightarrow{Reduction} RRRCCH_2OH$$

(2) Carboxylation of tertiary Grignards and reduction:

$$RRRCX + CO_2 \xrightarrow{Mg} RRR\overset{O}{\overset{\|}{C}}COH \xrightarrow{Reduction} RRRCCH_2OH$$

(3) Faworsky rearrangement of monobromo ketones:

$$RRCH\overset{O}{\overset{\|}{C}}CH_2Br + NaOCH_3 \longrightarrow RR\overset{CH_3O}{\overset{\diagdown\|}{C}}COCH_3 \xrightarrow{Reduction}$$

$$\underset{R}{\overset{CH_3}{\underset{|}{\overset{|}{RRCCH_2OH}}}}$$

(4) Addition of $CO+H_2O$ to olefins followed by reduction:

$$RRC=CRR \xrightarrow[BF_3-H_2O]{600\ Atm.\ CO} RRCH\overset{RO}{\overset{\|}{\underset{R}{\overset{|}{C}}}}COH \xrightarrow{Reduction}$$

$$\underset{R}{\overset{R}{\underset{|}{\overset{|}{RRCHCCH_2OH}}}}$$

R in the above four methods represents an alkyl radical and X is a halogen.

Although the aforementioned prior methods are effective in providing tertiary beta alcohols, they have the drawback of either requiring the use of expensive raw materials or can only be used to make specific types of tertiary beta alcohols.

In contrast I have discovered a novel method of producing tertiary beta alcohols which requires relatively inexpensive raw materials and is applicable to the production of a wide variety of alcohols.

More particularly, I have discovered that by esterifying a diol of the formula $$R^1-CH-CH-\underset{R^4}{\overset{R^3}{\underset{|}{\overset{|}{C}}}}-CH_2OH$$
$$\phantom{R^1-CH-}R^2\ \ OH$$

with an acylating agent, e.g., with a monobasic acid or an acid anhydride, to form a diester of the diol, subsequently pyrolyzing the thus-formed diester to produce an unsaturated monoester of the formula $$R^1-C=CH-\underset{R^4}{\overset{R^3}{\underset{|}{\overset{|}{C}}}}-CH_2O\text{-Acyl}$$
$$\phantom{R^1-C=CH-}R^2$$

hydrogenating the unsaturated monoester, to form the saturated monoester, and finally saponifying the saturated monoester, a tertiary beta alcohol of the formula $$R^1-CH-CH_2-\underset{R^4}{\overset{R^3}{\underset{|}{\overset{|}{C}}}}-CH_2OH$$
$$\phantom{R^1-CH-CH_2}R^2$$

is formed. $R^1$, $R^2$, $R^3$, and $R^4$ are as heretofore defined.

Specific examples of the alkyl, aryl, alkaryl, and aralkyl radicals contemplated herein for $R^1$–$R^4$ are methyl, butyl, decyl, phenyl, diphenyl, naphthyl, tolyl, isopropyl phenyl, benzyl, and 2-phenylbutyl. Specific examples of the alcohols produced by the novel process are 2,2-dimethyl-1-butanol; 2,2,4-trimethyl-1-pentanol; and 2,2-diethyl-1-decanol, 2-methyl-2-tolyl-1-butanol, 2,2-dimethyl-4-phenyl-1-pentanol, and 2-methyl-2-propyl-4-benzyl-1-hexanol.

In detail, my method can be described as a four stage reaction:

STAGE I

The first stage comprises reacting in the liquid phase a 1,3 diol of the formula $$R^1-CH-CH-\underset{R^4}{\overset{R^3}{\underset{|}{\overset{|}{C}}}}-CH_2OH$$
$$\phantom{R^1-CH-}R^2\ \ OH$$

with an acylating agent with or without the presence of an acylation catalyst at a temperature between about 50 and 400° F., preferably between 200 and 350° F., in a mol ratio of acylating agent to diol of between about 2:1 and 10:1, preferably between 3:1 and 4:1, to form the diacylate of the formula $$R^1-CH-CH-\underset{R^4}{\overset{R^3}{\underset{|}{\overset{|}{C}}}}-CH_2O\text{-Acyl}$$
$$\phantom{R^1-CH-}R^2\ \ \underset{\phantom{X}}{\overset{|}{O}}$$
$$\phantom{R^1-CH-CH-\overset{R^3}{\underset{|}{\overset{|}{C}}}-CH_2O-}\overset{|}{\text{Acyl}}$$

The acylating agents advantageously employed are the monobasic fatty acids of from 2 to 10 carbons such as acetic acid, butyric acid, heptoic acid and their corresponding anhydrides of the formulas $$R^5COOH \text{ and } R^5-\overset{O}{\overset{\|}{C}}-O-\overset{O}{\overset{\|}{C}}-R^5$$

where $R^5$ is an alkyl radical of 1 to 9 carbon atoms.

Examples of acylation catalysts which may be used are pyridine, alkali metal acetates (e.g. sodium acetate), and mineral acids such as sulfuric, hydrochloric, nitric and phosphoric acids. These catalysts are employed in an amount between 0.1 and 10 wt. percent based on the reaction mixture.

The first stage reaction is desirably conducted in the liquid phase and therefore inert liquid solvent such as octane, decane, and xylene and superatmospheric pressure can be employed whenever they are needed to promote a liquid phase reaction. The crude diacylate product can be recovered by standard means such as by filtration if a precipitate in the reaction mixture or by fractional distillation if in solution with the reaction mixture.

STAGE II

The diacylate recovered from the first stage is selectively decomposed in the second stage to form the corresponding unsaturated monoacylate of the formula

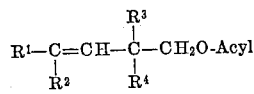

This selective decomposition is accomplished by passing the diacylate and inert gas, the latter to supply locomotion for the diacylate reactant and unsaturated monoester product, through a reactor maintained at a temperature between about 800 and 1100° F., preferably between 900 and 960° F. An example of the type of pyrolysis reactor contemplated herein is a Pyrex tube encased by an electric furnace and packed with materials such as raschig rings to aid in the diffusion of the reactant. At the pyrolysis temperatures recited herein, the unsaturated monoester product is a gas and is recovered upon withdrawal from the pyrolysis reactor by any standard means such as by passing the product gas through a water-cooled condenser to form a product condensate. Desirably, the collected product is washed with water to remove any acid formed during the pyrolysis. It is also desirable to dry the washed product. Specific examples of suitable drying agents are anhydrous potassium carbonate and anhydrous calcium carbonate.

STAGE III

The unsaturated monoester of Stage II is then hydrogenated to form the saturated monoester of the formula

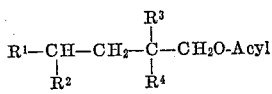

This hydrogenation is accomplished by contacting the unsaturated monoester with hydrogen under a hydrogen pressure of between about 300 and 5000 p.s.i.g., preferably between 900 and 2000 p.s.i.g., in the presence of a hydrogenation catalyst such as Raney nickel, platinum, palladium, and copper at a temperature between 80 and 450° F., preferably between 100 and 150° F. The hydrogenation of the unsaturated ester may be conducted batchwise such as in a stainless steel batch reactor, preferably with agitation, or may be conducted continuously such as passing a mixture of hydrogen and unsaturated acylate through a stainless steel tubular reactor, a fixed bed reactor or a fluidized bed reactor where the tubes are fitted with or the beds comprise a hydrogenation catalyst, at a space velocity of between about 0.2 and 10 vol. mixture/vol. of reactor space/hr. It is desirable that the unsaturated acylate be in the liquid phase during the hydrogenation. Therefore, a suitable inert solvent for the unsaturated acylate such as methanol can be employed if the acylate is a solid under the hydrogenation conditions. The saturated monoacylate product can be separated from the mixture by any standard means such as by fractional distillation, filtration and decantation. The means of separation will, of course, depend on the state of the reaction mixture. For example, if the saturated monoacylate is a precipitate in the reaction mixture, filtration or decantation will suffice. If it is in solution, fractional distillation would be a suitable means of isolation.

STAGE IV

In the final stage of the novel process the saturated monoacylate recovered from the previous stage is saponified to form the desired tertiary beta alcohol of the formula

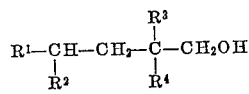

The saponification procedure in this final stage comprises contacting the saturated monoacylate with an aqueous base at a temperature desirably between about 150 and 400° F. Suitable aqueous base solutions are those containing 10 to 20 weight percent of basic material such as alkali metal and alkaline earth metal hydroxides, oxides or hydrated oxides. Normally stoichiometric quantities of aqueous base are employed. Subsequent to the treatment of the saturated acylate with base, the tertiary beta alcohol product is separated from the reaction mixture by standard means such as extraction with a selective solvent, e.g., benzene, followed by a fractional distillation step.

Within the scope of my invention I contemplate a modification of the above-described four stage procedure:

If desired, Stages I and II of the above-described process can be combined to form the unsaturated monoacylate directly from a mixture of diol and acylating agent. This telescoping of Stages I and II is accomplished by passing a mixture of diol and acylating agent with or without the presence of an acylation catalyst through the pyrolysis reactor of Stage II under the conditions recited for Stage II. This modified procedure eliminates the necessity of separately forming the diacylate and then the subsequent decomposition to the unsaturated monoester. The unsaturated monoacylate product in this modified procedure is also recovered in the manner of Stage II.

The following examples are presented to further illustrate my invention and are not to be taken as limiting. Examples I–VIII illustrate the preparation of 2,2,4-trimethyl-1-pentanol from 2,2,4-trimethyl-1,3-pentanediol. More specifically Examples I–IV illustrate Stage I of the process. Example V illustrates Stage II and Examples VI and VII illustrate Stages III and IV. In addition, Examples VIII to X disclose the preparation of 2,2-dimethyl-1-butanol from 2,2-dimethyl-1,3-butanediol. Example VIII illustrates Stage I, Example IX illustrates Stage II and Example X illustrates Stages III and IV. Examples XI and XII illustrate a modification of the novel procedure whereby Stages I and II are combined.

*Example I*

This example describes the conversion of 2,2,4-trimethyl-1,3-pentanediol to 2,2,4-trimethyl-1,3-pentanediol diacetate.

To a 3-necked 3 liter flask fitted with a thermometer, reflux condenser and stirrer, there was added 1,003 grams (6.9 mols) of 2,2,4-trimethyl-1,3-pentanediol and 1,660 grams (16.2 mols) of acetic anhydride. The reaction mixture was rapidly mixed and then distilled to a pot temperature of 417° F. and a head temperature of 255–282° F. The distillation residue weighed 1,612 grams. The residue was analyzed and found to have a saponification number of 506, an hydroxyl number of 0 and a neutralization number of 36. It was identified as crude 2,2,4-trimethyl-1,3-pentanediol diacetate. The calculated values for 2,2,4-trimethyl-1,3-pentanediol diacetate are a saponification number (Sap. No.) of 487, a hydroxyl number (OH No.) of 0 and a neutralization number (Neut. No.) of 0. The theoretical yield for said diacetate is 1,620 grams.

*Example II*

This example further illustrates the conversion of 2,2,4-trimethyl-1,3-pentanediol to the diacetate derivative thereof.

To a 50 gallon stainless steel reactor fitted with a thermometer, reflux condenser and stirrer, there were added 74.3 pounds (0.507 pound mol) of 2,2,4-trimethyl-1,3-pentanediol and 1 pound of pyridine. To the stirred solution of diol and pyridine preheated to 266° F., 115 pounds (113 pound mols) of acetic anhydride was incrementally added over a period of about 2 hours. The resultant mixture was refluxed for 3 hours and then stripped to a pot temperature of 419° F. to leave a residue of crude 2,2,4-trimethyl-1,3-pentanediol diacetate having a saponification number of 496, a neutralization number of 25 and an hydroxyl number of 0. The crude product weighed 113.9 pounds.

*Example III*

The procedure of Example II was repeated except that 105 pounds (0.72 pound mol) of 2,2,4-trimethyl-1,3-pentanediol, 160 pounds (1.57 pound moles) acetic anhydride and 700 milliliters of pyridine were employed. The crude 2,2,4-trimethyl-1,3-pentanediol diacetate product weighed 161.8 pounds, the theoretical yield being 166 pounds. The crude product had a saponification number of 498, a neutralization number of 27 and a hydroxyl number of 0.

*Example IV*

This example is still a further illustration of the pentanediol conversion to diacetate.

To a 10 liter three-necked flask fitted with a thermometer, reflux condenser and stirrer there were added 3,000 grams (20.6 mol) of 2,2,4-trimethyl-1,3-pentanediol, 145 mls. of pyridine and 2,000 mls. of anhydrous ether, 4,280 grams (42 mols) of acetic anhydride with stirring over a period of three hours. The resulting mixture was refluxed for 12 hours, stripped first at atmospheric pressure to 392° F. pot temperature and finally to 262° F. heat temperature at 20 mm. Hg pressure. The residue weighed 4.23 kg. and had a saponification number of 488 and an hydroxyl number of 2. The residue was identified as 2,2,4-trimethyl-1,3-pentanediol diacetate having a theoretical saponification number of 487 and a hydroxyl number of 0.

*Example V*

This example describes the pyrolysis of the diacetate products of Examples I–IV to form 2,2,4-trimethyl-3-penten-1-ol acetate.

The pyrolysis apparatus employed comprises a series of connected Pyrex tubes packed with Raschig rings or glass beads with a heat supply generated by steam or an electric furnace. The tube or tubes nearest the entrance of the pyrolysis apparatus are the preheater tubes and the final tube is the pyrolysis tube.

In Runs A, B and D described below in Table 1 the electrically heated pyrolysis tube was of 1" x 24" dimensions (about 200 cc. of the tube was in the heated section of the furnace) and was packed with ¼" glass helices except for Run B where ¼" Raschig rings were used. The pyrolysis tube in Run C was 4" x 28" in size and packed with ⅜" Raschig rings. No preheater was employed for Run D. An electrically heated 1" x 18" tube packed with glass beads was used as a preheater in Runs A and B. A steam heated tube (1" x 18" packed with glass beads) followed by two electrically heated tubes (3" x 32" packed with Raschig rings) were used as preheaters in Run C.

The packed tubular pyrolysis reactor and preheaters (if used) were flushed with nitrogen while being heated to the desired temperature. A slow stream of nitrogen as a carrier gas together with 2,2,4-trimethyl-1,3-pentanediol diacetate were passed through the reactor. The reaction products passing from the pyrolysis tube were introducde into a glass flask fitted with a water cooled refluxed condenser where they are condensed. The condensed products were then fractionally distilled to isolate 2,2,4-trimethyl-3-penten-1-ol-acetate. The reaction and purification data for Runs A, B, C and D are found below in Table 1.

TABLE 1.—PYROLYSIS OF 2,2,4-TRIMETHYL-1,3-PENTANEDIOL DIACETATE AND RECOVERY OF 2,2,4-TRIMETHYL-3-PENTEN-1-OL ACETATE

| Run No | A | B | C | D |
|---|---|---|---|---|
| Diacetate charge | Product of Example I (809 g.) | Product of Example I (773 g.) | Product of Example II and III (277 lbs.) | Product of Example IV (4208 g.) |
| Pyrolysis reaction conditions: | | | | |
| Preheater temp., ° F | 725-752 | 700-770 | 565-800 | (¹) |
| Temperature of preheated charge, ° F | 541-599 | 410-561 | | |
| Reactor temp., ° F | 945-965 | 920-960 | 900-970 | 860-875 |
| Reactor space velocity, vol. of charge/vol of reactor/hr | 1.2 | 1.4 | 2-2.8 | 0.3-0.5 |
| Total crude product, wt. percent basis charge | 98 | 98 | 98 | 98 |
| Recovery and yield of 2,2,4-trimethyl-3-pentene-1-ol acetate product: | | | | |
| Distillation recovery temp., ° C./mm. of Hg | 84-86/20 | 84-86/20 | 82-87/20 | 79-90/20 |
| Refractive index of product at 20° C | 1.4382 | 1.4381 | 1.4384 | 1.4379 |
| Wt. percent product yield, basis diacetate charge | 52 | 48 | 57 | 43 |

¹ Preheater not used.

*Example VI*

This example illustrates the conversion of 2,2,4-trimethyl-3-penten-1-ol acetate to 2,2,4-trimethyl-1-pentanol acetate and the conversion of the latter to 2,2,4-trimethyl-1-pentanol.

To a 2700 ml. high pressure stainless steel shaker bomb there was added 1833 grams of 2,2,4-trimethyl-3-penten-1-ol acetate derived from Run D described in Table 1 of Example V and 56 grams of Raney nickel. The reactor was then pressured with hydrogen to a pressure of 1600 p.s.i.g. and heated at a temperature of 125° F. for a period of 9 hours. At the end of the reaction period the catalyst was separated from the reaction mixture by filtration to yield 1849 grams of liquid product. The product was identified as 2,2,4-trimethyl-1-pentanol acetate having an iodine number of 1.1, a saponification number of 318 and a refractive index $(n_D^{20})$ of 1.4170. The theoretical properties for 2,2,4-trimethyl-1-pentanol acetate are an iodine number of 0 and a saponification number of 326.

To a 5 liter 3-necked glass flask fitted with a stirrer, thermometer and reflux condenser there was added 1740 grams of 2,2,4-trimethyl-1-pentanol acetate produced above, 500 grams of sodium hydroxide, 1200 milliliters of water and 800 milliliters of methanol. The reaction mixture was refluxed for 9½ hours, cooled and mixed with 2 liters of water. The aqueous layer was extracted twice with 500 milliliter portions of benzene. All of the organic layers were combined and dried over anhydrous calcium sulfate and then distilled until the head temperature reached 187° F. and the pot temperature reached 219° F. The residue was fractionally distilled and the fraction collected between 320-333° F. had a hydroxy number of 425 and a refractive index $(n_D^{20})$ of 1.4300.

It was identified as 2,2,4-trimethyl-1-pentanol. The yield was 67 wt. percent based on acetate charge material.

The 3,5-dinitrobenzoate derivative of 2,2,4-trimethyl-1-pentanol was prepared by reaction of the pentanol with 3,5-dinitrobenzoyl chloride in the presence of pyridine and recrystallizing the product from 95 percent ethanol. The melting point of the derivative product was 124° F. Analysis of the derivative was as follows. Calc'd for $C_{15}H_{20}N_2O_6$: 55.5; H, 6.26; N, 8.64. Found: C, 56.0; H, 6.29; N, 8.55.

*Example VII*

This example illustrates the conversion of 2,2,4-trimethyl-3-penten-1-ol acetate to 2,2,4-trimethyl-1-pentanol utilizing a continuous hydrogenation step.

In a continuous hydrogenation operation, 174 pounds of crude 2,2,4-trimethyl-3-penten-1-ol acetate produced in Run C of Example V were passed through a stainless steel tubular reactor containing 1703 grams of nickel catalyst at a charge rate of 1200 grams per hour, at a temperature of 400° F., and under a hydrogen pressure of 1000 p.s.i.g. The final product recovered weighed 163 pounds and was identified as 2,2,4-trimethyl-1-pentanol acetate.

161 pounds of the above crude pentanol acetate, 48.3 pounds sodium hydroxide and 96 pounds of water were refluxed with stirring for 16 hours and washed once with 10 gallons of water followed by another 10 gallon wash. 5 gallons of benzene was then added to the mixture and the mixture was refluxed until water separation was completed (5½ hours). The reaction mixture was then stripped to a head temperature of 210° F. (pot temperature 336° F.) and the residue fractionally distilled. The distillation cut recovered at between 327–338° F. had a refractive index ($n_D^{20}$) of 1.4299, a hydroxy number of 420 and was identified as 2,2,4-trimethyl-1-pentanol. The yield of alcohol product was calculated as 44 wt. percent based on saturated pentanol acetate charge.

*Example VIII*

This example describes the preparation of 2,2-dimethyl-1,3-butanediol diacetate from 2,2-dimethyl-1,3-butanediol.

To a 3-necked 5 liter flask fitted with a thermometer reflux condenser and a stirrer there were added 2 kilograms (17 mols) of 2,2-dimethyl-1,3-butanediol and 40 milliliters of pyridine. To the mixture of diol and pyridine was added 2.9 kilograms (38 mols) of acetic anhydride with stirring over a period of 1¼ hours during which time the reaction temperature rose to 221° F. The resulting mixture was refluxed for 2 hours and then stripped to a pot temperature of 481° F. and a head temperature of 315° F. leaving 3521 grams of residue having a refractive index ($n_D^{20}$) of 1.4252, a boiling point of 235° F. at 20 mm. Hg, a neutralization number of 38.2, a saponification number of 541 and an hydroxyl number of 1 indicating it was the 2,2-dimethyl-1,3-butanediol diacetate contaminated with a little acetic anhydride or acetic acid. The theoretical Sap. No. for this compound is 556.

*Example IX*

This example illustrates the pyrolysis of the diacetate produced in Example VIII to form 2,2-dimethyl-3-buten-1-ol acetate. The pyrolysis equipment employed was the same as described in Example V except a 1" x 18" Pyrex tube packed with glass beads was used as a preheater and 1" x 24" Pyrex tube fitted with glass helices was employed as the pyrolysis tube.

The packed tubular reactor and preheater was flushed with nitrogen while being heated to the desired temperature. A slow stream of carrier nitrogen was passed through the reactor along with 3,329 grams of diacetate. The reaction conditions were as follows:

| Conditions: | Values |
|---|---|
| Preheater temp., °F. | 730–850 |
| Temperature of preheater charge, °F | 518–608 |
| Reactor temp., °F. | 930–960 |
| Space velocity [1] | 1.9 |

[1] Volume diacetate/volume pyrolysis reactor/hour.

The crude reaction product weighted 3208 grams and had a neutralization number of 263. The product was washed twice with equal volumes of water, dried first over 50 grams of anhydrous potassium carbonate and finally over 50 grams of anhydrous calcium sulfate. The product weighed 2200 grams and had a neutralization number of 1. It was fractionally distilled and the distillate collected between 297–304° F. at atmospheric pressure was identified 2,2-dimethyl-3-buten-1-ol acetate representing a mol percent conversion of 73%.

*Example X*

This example illustrates the conversion of 2,2-dimethyl-3-buten-1-ol acetate prepared in Example IX by hydrogenation and saponification to 2,2-dimethyl-1-butanol.

2007 grams of the unsaturated monoacetate of Example IX and 45 grams of Raney nickel were placed in a high pressure stainless shaker bomb and the bomb was pressured with hydrogen to a pressure of 1500 p.s.i.g. The bomb was then heated for 3 hours at 125° F. At the end of the reaction period, the reaction product was filtered to remove the nickel catalyst and 540 grams of the filtrate were saponified by refluxing for a period of 7 hours with an aqueous solution of sodium hydroxide. The reaction mixture was cooled, and subjected to an extraction with 200 milliliters of benzene. The benzene extract solution was in turn subjected to fractional distillation. The distillate collected between 271–273° F. (atmospheric pressure) and was identified as 2,2-dimethyl-1-butanol. This product had an actual hydroxyl number of 527 and a theoretical hydroxyl number of 550.

*Example XI*

This example illustrates the modified procedure whereby the steps of acylating a diol and pyrolyzing the resultant diacyl product to form an unsaturated monoacyl are combined.

A mixture of 100 grams (0.69 mol) of 2,2,4-trimethyl-1,3-pentadiol, 210 grams (2.1 mol) of acetic anhydride and 5 milliliters of pyridine were passed through a 1" x 24" pyrolysis tube packed with ¼" glass helices. About 200 cc. of the tube was enclosed in an electric furnace and no preheater was used. The pyrolysis was conducted at a temperature of 906–920° F. and the reaction mixture was passed through the pyrolysis tube at a space velocity of 0.26 volume of charge per volume of reactor per hour. The product gas exiting from the pyrolysis reactor was condensed utilizing a water cooled condenser and the condensate was fractionally distilled. The distillate recovered had a boiling point between 180–185° F. at 20 mm. Hg pressure, weighed 30.1 grams and had a refractive index ($n_D^{20}$) of 1.4370. This cut was identified by its infrared absorption spectrum as 2,2,4-trimethyl-3-penten-1-ol acetate.

*Analysis.*—Calc'd for 2,2,4-trimethyl-3-penten-1-ol acetate: Sap. No., 330; OH No., 0. Found: Sap. No., 323; OH No., 0.

*Example XII*

The procedure of Example XI was repeated with the exception that a reactor temperature between 832 and 850° F. and a space velocity of 0.29 were employed. The condensate product was distilled fractionally. The cut collected between 187–192° F. at 20 mm. Hg pressure weighed 33.6 grams, had a refractive index ($n_D^{20}$) of 1.4372 and was identified by its infrared absorption spectrum as 2,2,4-trimethyl-3-penten-1-ol acetate.

All percentages, parts and ratios herebefore and hereafter recited are based on weight, unless otherwise stated.

Obviously, many modifications and variations of the invention as hereinbefore set forth may be made without departing from the spirit and scope thereof and therefore only such limitations should be imposed as are indicated in the appended claims.

I claim:

1. A process for preparing an alcohol of the formula

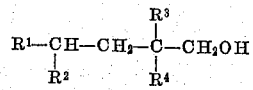

where $R^1$ and $R^2$ are selected from the group consisting of hydrogen, alkyl, aryl, alkaryl, and aralkyl radicals, where $R^3$ and $R^4$ are selected from the group consisting of alkyl, aryl, alkaryl, and aralkyl radicals comprising contacting a 1,3-diol of the formula

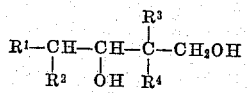

with an acid member selected from the group consisting of $R^5COOH$ and

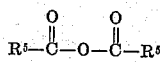

where $R^5$ is an alkyl radical of from 1 to 9 carbons at a temperature between about 50 and 400° F. in a mol ratio of said diol to said member of between about 1:2 and 1:10 to form a diester of the formula

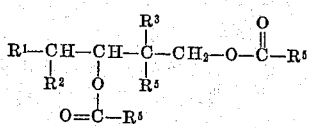

subjecting said diester to a temperature between about 800 and 1100° F. to form an unsaturated monoester of the formula

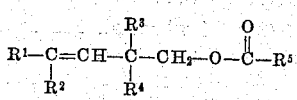

contacting said unsaturated monoester with hydrogen under a hydrogen pressure between about 300 and 500 p.s.i.g. in the presence of a hydrogenation catalyst at a temperature between about 80 and 450° F. to form a saturated monoester of the formula

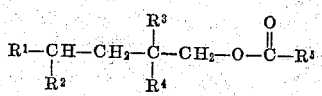

and contacting said saturated monoester with an aqueous base at a temperature between about 150 and 400° F. to form said alcohol.

2. The method in accordance with claim 1 wherein said diol and said member are contacted in the presence of an acylation catalyst selected from the group consisting of pyridine, alkali metal acetates and mineral acids and said hydrogenation catalyst is selected from the group consisting of nickel, platinum, palladium and copper.

3. A method in accordance with claim 1 wherein said diol and said member are contacted in the presence of pyridine, said tertiary beta alcohol is 2,2-dimethyl-1-butanol, said diol is 2,2-dimethyl-1,3-butanediol, said member is acetic anhydride, said hydrogenation catalyst is nickel, and said base is aqueous sodium hydroxide.

4. A method in accordance with claim 1 wherein said diol and said member are contacted in the presence of pyridine, said alcohol is 2,2,4-trimethyl-1-pentanol, said diol is 2,2,4-trimethyl-1,3-pentanediol, said acid member is acetic anhydride and said base is aqueous sodium hydroxide.

5. A process for preparing an alcohol of the formula

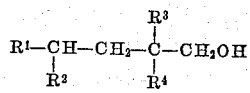

where $R^1$ and $R^2$ are selected from the group consisting of hydrogen, alkyl, aryl, alkaryl and aralkyl radicals, where $R^3$ and $R^4$ are selected from the group consisting of alkyl, aryl, alkaryl, and aralkyl radicals comprising heating a mixture of 1,3-diol of the formula

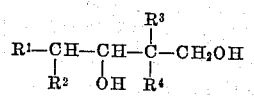

and an acid member selected from the group consisting of $R^5COOH$ and

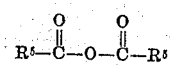

where $R^5$ is an alkyl radical of from 1 to 9 carbons, at a temperature between about 800 and 1100° F. in a mol ratio of said diol to said member between about 1:2 and 1:10 to form an unsaturated monoester of the formula

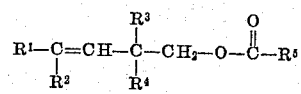

contacting said unsaturated monoester with hydrogen under a hydrogen pressure of between about 300 and 5000 p.s.i.g. in the presence of a hydrogenation catalyst at a temperature between about 80 and 450° F. to form a saturated monoester of the formula

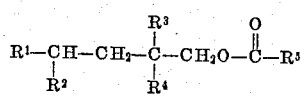

and contacting said saturated monoester with an aqueous base at a temperature between about 150 and 400° F. to form said alcohol.

6. The method in accordance with claim 5 wherein said alcohol is 2,2,4-trimethyl-1-pentanol, wherein said diol is 2,2,4-trimethyl-1,3-pentanediol, said acid member is acetic anhydride, said hydrogenation catalyst is nickel, and wherein said member and said diol are contacted in the presence of pyridine.

7. A process for preparing an alcohol of the formula

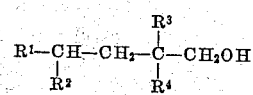

where $R^1$ and $R^2$ are selected from the group consisting of hydrogen, alkyl, aryl, alkaryl and aralkyl radicals and where $R^3$ and $R^4$ consisting of alkyl, aryl, alkaryl and aralkyl radicals comprising contacting a 1,3-diol of the formula

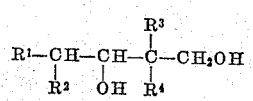

at an elevated temperature with an acid selected from the group consisting of $R^5COOH$ and

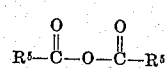

to form an unsaturated ester of the formula

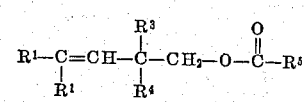

where $R^5$ is an alkyl radical of from 1 to 9 carbons, contacting said unsaturated ester with hydrogen in the presence of hydrogenation catalyst at an elevated temperature to form a saturated ester of the formula

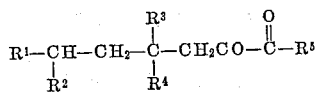

and contacting said saturated monoester with a base to form said alcohol.

8. A process for preparing an alcohol of the formula

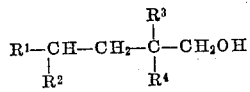

where $R^1$ and $R^2$ are selected from the group consisting of hydrogen, alkyl, aryl, alkaryl and aralkyl radicals and where $R^3$ and $R^4$ are selected from the group consisting of alkyl, aryl, alkaryl and aralkyl radicals comprising contacting a 1,3-diol of the formula:

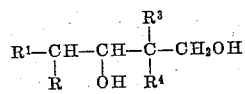

at an elevated temperature with an acid selected from the group consisting of $R^5COOH$ and

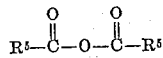

to form an unsaturated ester of the formula:

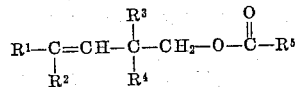

where $R^5$ is methyl, contacting said unsaturated ester with hydrogen in the presence of hydrogenation catalyst at an elevated temperature to form a saturated ester of the formula:

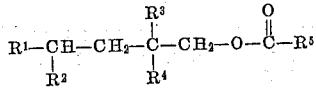

and contacting said saturated monoester with a base to form said alcohol.

9. A process for preparing an alcohol of the formula:

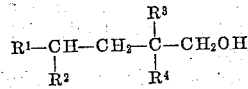

where $R^1$ and $R^2$ are selected from the group consisting of hydrogen, alkyl, aryl, alkaryl, and aralkyl radicals, where $R^3$ and $R^4$ are selected from the group consisting of alkyl, aryl, alkaryl, and aralkyl radicals comprising contacting a 1,3-diol of the formula:

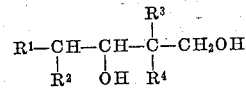

with an acid member selected from the group consisting of

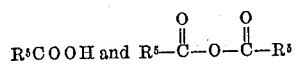

where $R^5$ is methyl at a temperature between about 50 and 400° F. in a mol ratio of said diol to said member of between about 1:2 and 1:10 to form a diester of the formula:

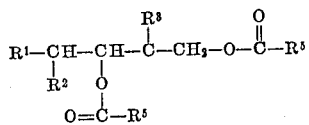

subjecting said diester to a temperature between about 800 and 1100° F. to form an unsaturated monoester of the formula:

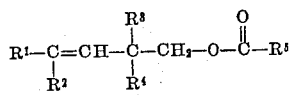

contacting said unsaturated monoester with hydrogen under a hydrogen pressure between about 300 and 5000 p.s.i.g in the presence of a hydrogenation catalyst at a temperature between 80 and 450° F. to form a saturated monoester of the formula:

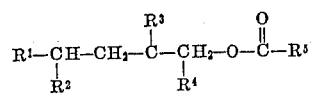

and contacting said saturated monoester with an aqueous base at a temperature between about 150 and 400° F. to form said alcohol.

References Cited by the Examiner

UNITED STATES PATENTS

| | | | |
|---|---|---|---|
| 2,173,114 | 9/39 | Howk et al. | 260—495 |
| 2,335,027 | 11/43 | Ritter | 260—638 |
| 2,441,540 | 5/48 | Ash et al. | 260—638 |
| 2,941,011 | 6/60 | Hagemeyer et al. | 260—638 |

OTHER REFERENCES

Prileshaiev: Chem. Abstracts, vol. (1907), pp. 2879, 2889.

Hurd: The Pyrolysis of Carbon Compounds, Chemical Catalog Co., New York, 1929, pages 526, 527, 535.

Ellis: Hydrogenation of Organic Substances, 3rd edition, D. Van Nostrand, New York, 1930, page 198.

JOSEPH R. LIBERMAN, Primary Examiner.

CHARLES B. PARKER, LEON ZITVER, Examiner.